United States Patent
Burchett, Jr.

[11] Patent Number: 6,122,324
[45] Date of Patent: Sep. 19, 2000

[54] NARROWBAND SIMULTANEOUS MULTIBIT WIRELESS TRANSMISSION METHOD

[76] Inventor: Robert Lee Burchett, Jr., 1633 Caddington Dr., Rancho Palos Verdes, Calif. 90275

[21] Appl. No.: 09/146,217
[22] Filed: Sep. 2, 1998
[51] Int. Cl.[7] .......................... H04L 27/00; H04L 27/04; H03C 3/00
[52] U.S. Cl. .......................... 375/259; 375/295; 332/117
[58] Field of Search .................... 375/259, 264, 375/276, 286, 293, 295, 365; 327/42, 39, 74, 355; 341/173, 177; 332/117

[56] References Cited

U.S. PATENT DOCUMENTS

| | | | |
|---|---|---|---|
| 5,631,929 | 5/1997 | Jones et al. | 375/295 |
| 5,933,421 | 8/1999 | Alamouti et al. | 370/330 |

*Primary Examiner*—Tesfaldet Bocure
*Assistant Examiner*—Khai Tran
*Attorney, Agent, or Firm*—Gene Scott-Patent Law & Venture Group

[57] ABSTRACT

A method for simultaneously transmitting multiple bits of information through space using a time varying reference signal at a first selected fixed frequency, and a time varying synchronizing clock signal at a second selected fixed frequency establishing a clock period. The signals are combined repeatedly to obtain a multiple of additive and subtractive signals each differing from each other by an integer multiplier of the reference signal frequency. The signals are injected into an N-fold gate which is controlled by the clock signal so as to transmit N-M of the N derivative signals through the N-fold gate during each clock cycle, where $0 \leq M \leq N$ so as to produce an N bit word signal. The N bit signal is then mixed with a radio carrier signal for transmission of the N bit signal as a parallel transmission of the N bit signal. This process is repeated continuously to produce an N-times improvement in data transmission rate over serial transmission.

8 Claims, 3 Drawing Sheets

NARROWBAND SIMULTANEOUS MULTIBIT WIRELESS TRANSMISSION METHOD

BACKGROUND OF THE INVENTION

1. Field of the Invention

This invention relates generally to digital data transmission, and more particularly to a method for such transmission as a serial stream of N-bit words, each word being transmitted in a parallel format of the bits arranged with frequency spacing within a standard FCC channel.

2. Description of Related Art

Communication by wireless transmission with both analog and digital signals is well known in the art. Analog signals vary with time, frequency, amplitude or other characteristics of the signals in order to impress information onto the signals. Generally speaking digital signals vary simply by being in one of two or more signal states at each moment in time. Paging is an important application that has moved to standardize on the use of digital data transfer and is most often uses a binary coding system. Typical assigned bandwidth are in the range of 25 KHz. And state of the art technique is to use serial transmission either in two or four level code. Within an assigned bandwidth of 25 KHz typically 10 KHz is used to transmit binary data and the remaining 15 KHz is used as guard bands to insure separation of one channel to the next. A given signal is typically transmitted by tuning the transmitter to a frequency that is 5 KHz above and a second frequency that is 5 KHz below the center of the band in order to represent binary ones and zeros respectively. Currently, the state of the art is limited to approximately 6400 bits of information per second due to inherent physical limitations in the propagation of electromagnetic energy signals.

To improve on the rate of data transmission it will be necessary to either transmit at a higher rate of speed, improve the pulse rate per second, or pack additional pulses in parallel into the existing bandwidth. The latter technique is the subject of the present invention.

The prior art teaches the use of narrow band transmission of digital data signals. However, the prior art does not teach that such signals may consist of parallel bursts of binary formatted data. The present invention fulfills these needs and provides further related advantages as described in the following summary.

SUMMARY OF THE INVENTION

The present invention teaches certain benefits in construction and use which give rise to the objectives described below.

The present invention provides a method for simultaneously transmitting multiple bits of information through space using a time varying reference signal at a first selected fixed frequency, and a time varying synchronizing clock signal at a second selected fixed frequency establishing a clock period. The signals are combined repeatedly to obtain a multiple of additive and subtractive signals each differing from each other by an integral multiplier of the reference signal frequency. The signals are injected into an N-fold gate which is controlled by an information source so as to transmit N-M of the N derivative signals through the N-fold gate during each clock cycle, where $0 \leq M \leq N$ so as to produce an N bit word signal during each cycle. The N bit signal is then mixed with a radio carrier signal for transmission of the N bit signal as a parallel transmission. This process is repeated continuously.

A primary objective of the present invention is to provide a transmission method having advantages not taught by the prior art.

Another objective is to provide such a method having a higher throughput capacity than is possible over the same bandwidth using conventional transmission methods.

A further objective is to provide such a method using common devices arranged in a new and improved manner.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention. In such drawings.

DETAILED DESCRIPTION OF THE INVENTION

Figure 1:
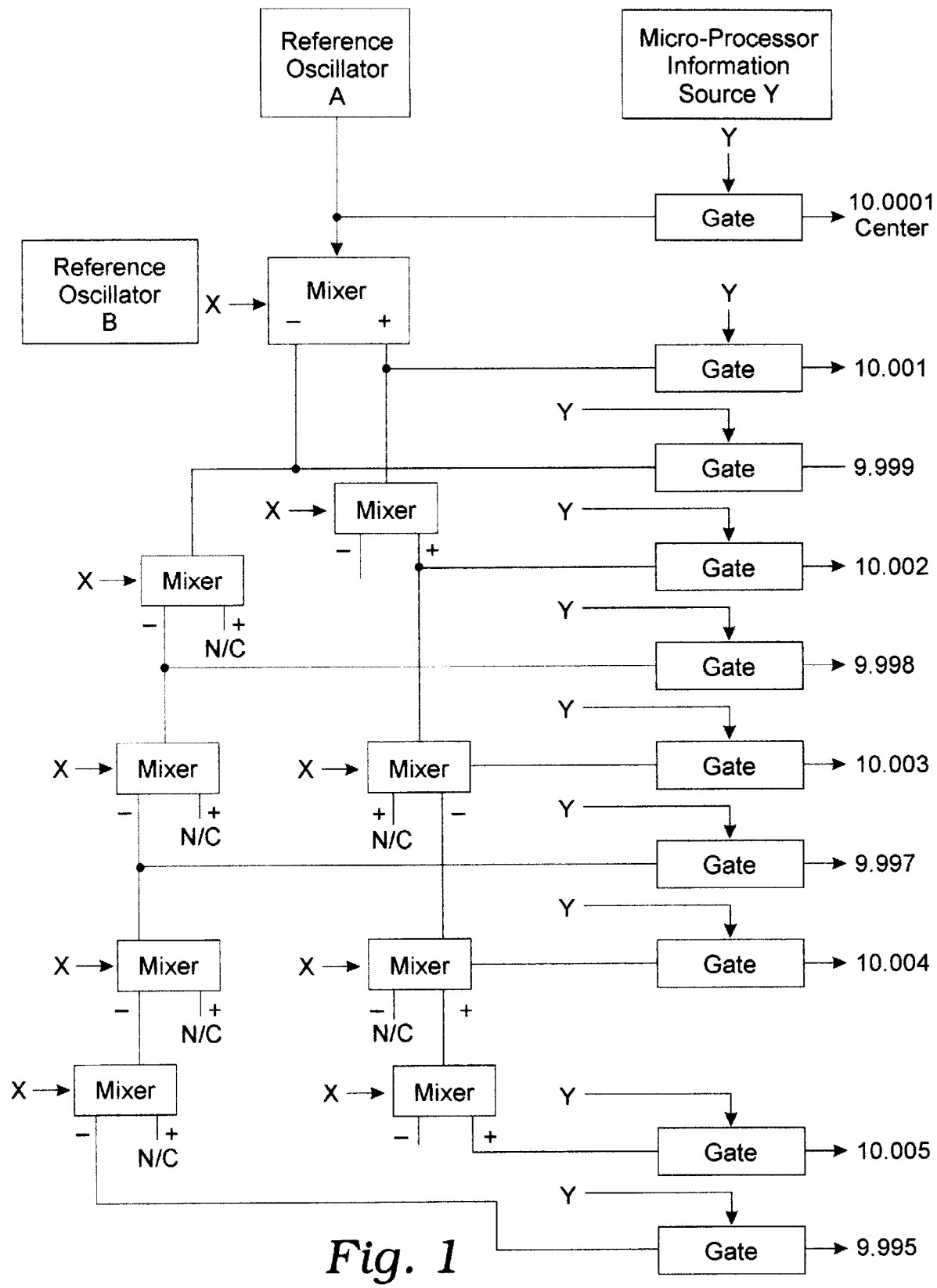
FIG. 1 is a signal flow block diagram defining the N-bit word generating method of the present invention.
Figure 2:
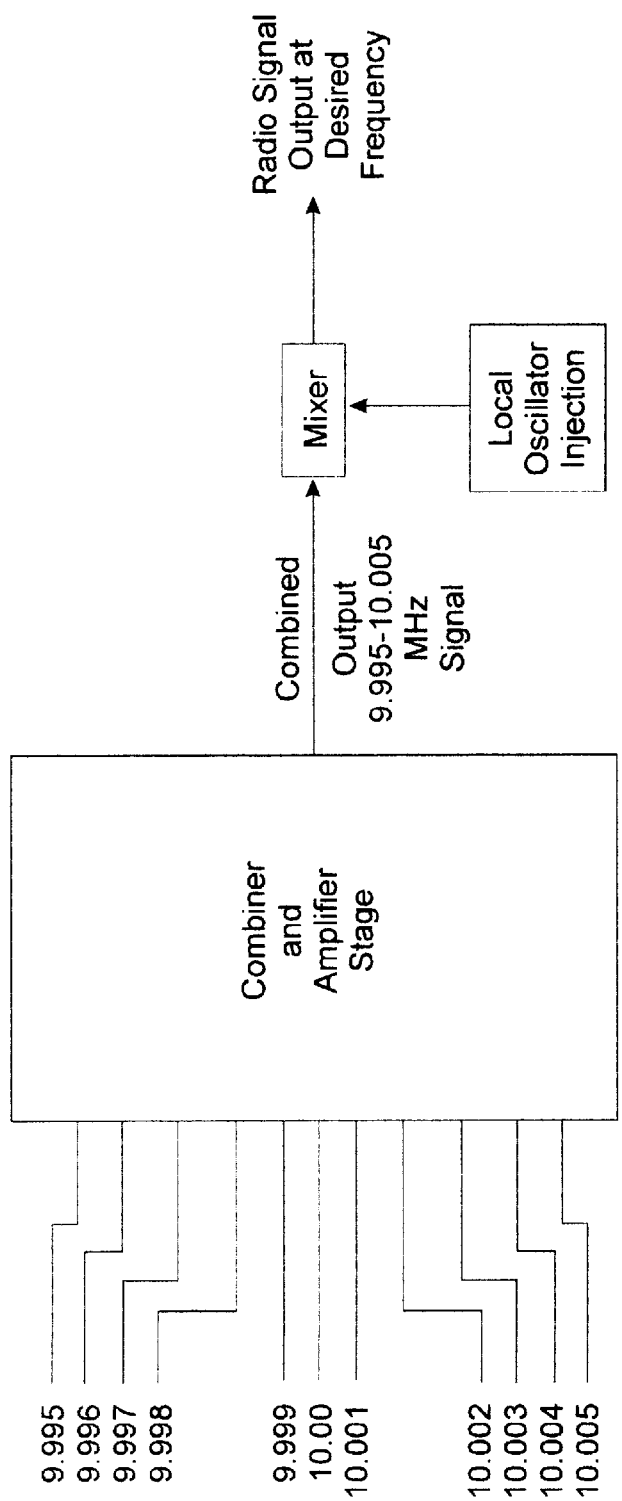
FIG. 2 is similar block diagram showing the means by which the N-bit word is transmitted.
Figure 4:
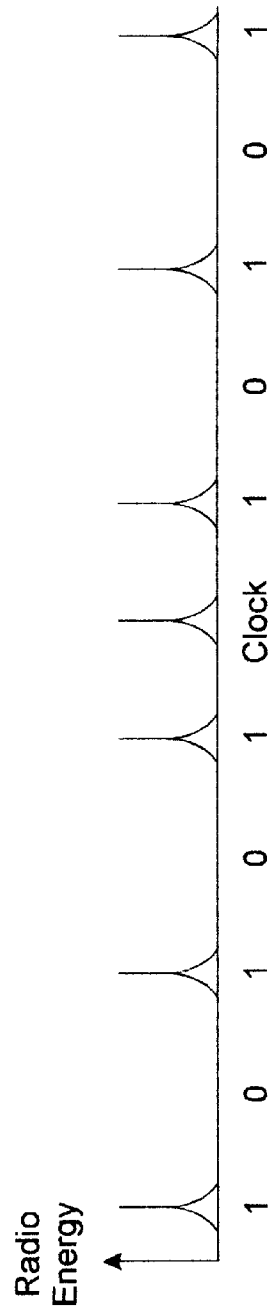
FIG. 4 is similar to FIG. 3, but showing a typical N-bit word as transmitted.

The above described drawing figures illustrate the invention, a method for simultaneously transmitting multiple bits of related information through space, the method in its preferred embodiment comprising the steps of: providing a time varying reference signal at a first selected fixed frequency such as 1 KHz, i.e., signal "X" in FIG. 1 from reference oscillator B; providing a time varying synchronizing clock signal at a second selected fixed frequency such as 10 KHz, i.e., from reference oscillator A in FIG. 1, establishing a clock period, the second selected fixed frequency being much greater then the first selected fixed frequency; combining the reference signal "X" with the clock signal to obtain an additive and a subtractive signals thereof as derivative signals, i.e., 10.001 MHz and 9.999 MHz, as shown in FIG. 1; combining the reference signal with the additive and the subtractive signals to obtain a further additive and a further subtractive signals thereof as further derivative signals, such as 9.995, 9.996, 9.997, 9.998; and 10.002, 10.003, 10.004, 10.005; repeating the above steps as required so as to provide a total of N derivative signals, in this example, 10 derivative signals, each of the derivative signals differing from each other by an integral multiplier of the "X" reference signal frequency, 1 KHz; injecting the N derivative signals into an N-fold gate, or alternately N individual gates as shown in FIG. 1, the N-fold gate being controlled by an information signal source "Y" so as to transmit N-M of the N derivative signals through the N-fold gate during each clock cycle, where M is an integer defined by: $0 \leq M \leq N$ so as to produce an N-bit word signal, as shown in FIG. 4; mixing the N-bit signal with a radio carrier signal, as shown in FIG. 2, for transmission of the N-bit signal as a parallel transmission; and finally, repeating the above steps during each said clock cycle so as to produce a continuous sequence of parallel signal transmissions of N-bit words. It should be noticed that the total bandwidth of 10 KHz is the same bandwidth that is allocated by the FCC for serial data transmission, yet the current method is able to increase data throughput by at least an order of magnitude.

Figure 2A:
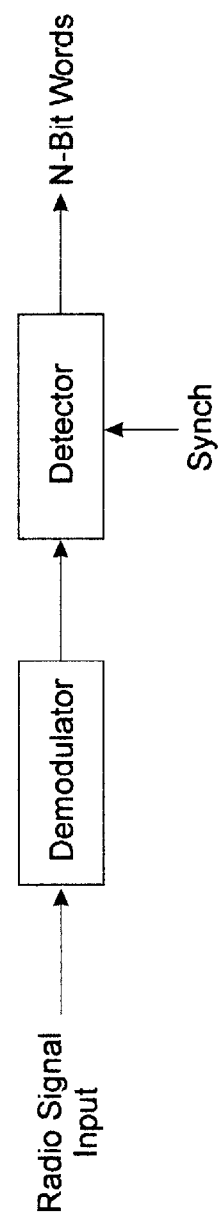
FIG. 2A is a block diagram showing the means by which the N-bit word is received.
Figure 3:
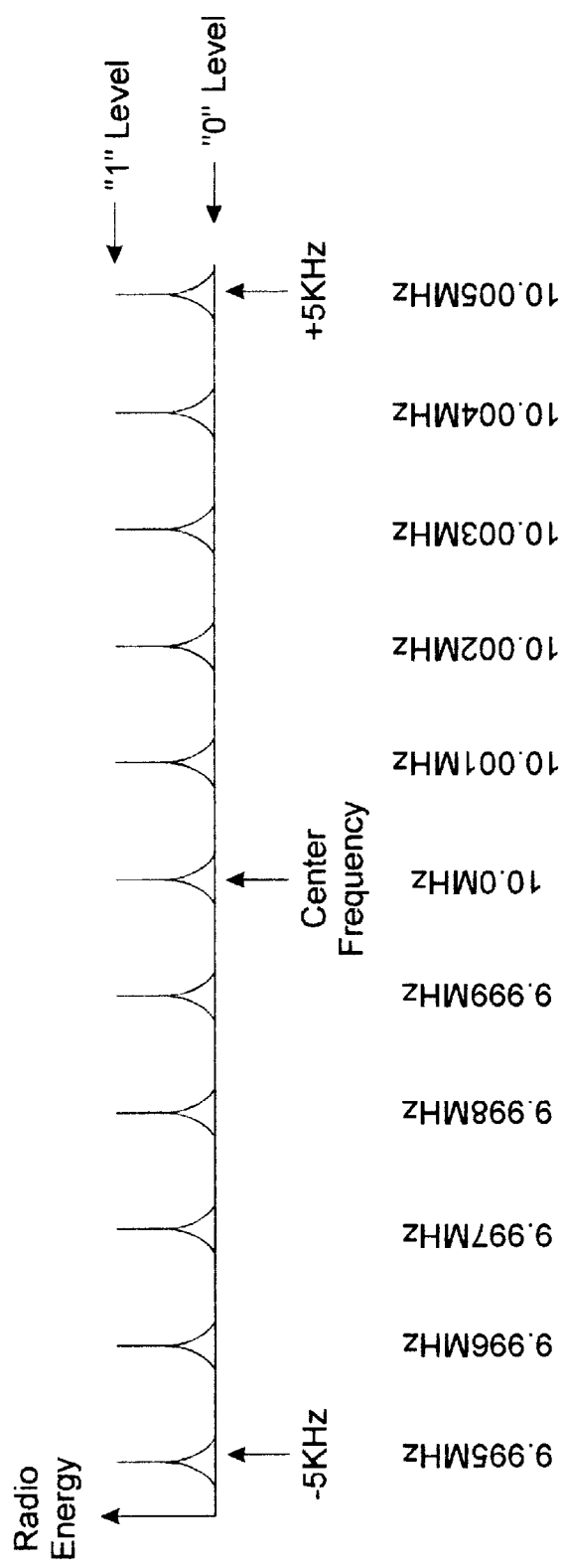
FIG. 3 is a radio spectrum diagram showing the presence of all bits in the N-bit word as it is transmitted.

Clearly the method may provide the additional step of amplifying the N-bit signal prior to transmission through space, as is well known in the art and shown in FIG. 2. Further, as shown in FIG. 2A the signal, when received, is demodulated and a detector Is synchronized with the clock signal so as to detect the N-bit signal for producing an N-bit word for each clock cycle. Such a process is merely the reverse of the above process.

The method is advantageously practiced wherein the N-fold gate is controlled by a digital signal "Y" derived preferably from a parallel input data transmission line, although the line may be serial and a parallel signal formed just prior to injection into the current method. Alternately, the input data may be derived directly from a microprocessor through an appropriate number of buffers for collecting and then releasing the N-bit words. Clearly, it is necessary for the N-fold gate to be controlled by a data source so as to enable the N-bit words to carry intelligent data.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A method for simultaneously transmitting multiple bits of information through space, the method comprising the steps of:

a) providing a time varying reference signal at a first selected frequency;

b) providing a time varying synchronizing clock signal at a second selected fixed frequency establishing a clock period, the second selected frequency being greater than the first selected frequency;

c) combining the reference signal with the clock signal to obtain an additive and a subtractive signals thereof as derivative signals;

d) combining the reference signal with the additive and the subtractive signals to obtain a further additive and a further subtractive signals thereof as further derivative signals;

e) repeating step (d) as required so as to provide a total of N derivative signals, each of the derivative signals differing from each other by an integer multiplier of the reference signal frequency;

f) injecting the N derivative signals into an N-fold gate, the N-fold gate being controlled by an information signal source so as to transmit N-M of the N derivative signals through the N-fold gate during each clock cycle, where $0 \leq M \leq N$ so as to produce an N bit word signal;

g) mixing the N derivative signals with a radio carrier signal for transmission of the N derivative signals as a parallel transmission of the N derivative signals; and h) repeating steps (a) through (g) during each said clock cycle so as to produce a continuous parallel transmission of the N derivative signals, whereby an information is transmitted at a high rate.

2. The method of claim 1 further providing the step of amplifying the N derivative signals before step (g).

3. The method of claim 1 further including the steps of:

i) demodulating the signal of step (h);

j) synchronizing a detector with the clock N derivative signals;

k) detecting the N derivative signals so as to produce an N bit word for each clock cycle.

4. The method of claim 1 wherein the N-fold gate is controlled by a digital signal derived from a parallel transmission line.

5. The method of claim 1 wherein the N-fold gate is controlled by a digital signal derived from a serial transmission line.

6. The method of claim 1 wherein the N-fold gate is controlled directly by a microprocessor.

7. A method for simultaneously transmitting multiple bits of information through space, the method comprising the steps of:

a) providing a total of N derivative signals, each of the derivative signals differing from each other by a reference signal frequency;

b) injecting the N derivative signals into an N-fold gate, the N-fold gate being controlled by an information signal source so as to transmit N-M of the N derivative signals through the N-fold gate during each of a clock cycle, where $0 \leq M \leq N$ so as to produce an N bit word signal;

c) mixing the N derivative signals with a radio carrier signal for transmission of the N derivative signals as a parallel transmission of the N derivative signals; and d) repeating steps (a) through (c) during each said clock cycle so as to produce a continuous parallel transmission of the N bit word signals, whereby an information is transmitted at a high rate.

8. A method for simultaneously transmitting multiple bits of information through space, the method comprising the steps of:

a) providing a total of N derivative signals each of the derivative signals being within an assigned bandwidth, and differing from each other by a reference signal frequency;

b) injecting the N derivative signals into an N-fold gate, the N-fold gate being controlled by an information signal source so as to transmit N-M of the N derivative signals through the N-fold gate during each of a clock cycle, where $0 \leq M \leq N$ so as to produce an N bit word signal;

c) repeating steps (a) and (b) during each said clock cycle so as to produce a continuous parallel transmission of the N bit word signals, whereby an information is transmitted at a high rate.

* * * * *